US009251639B2

(12) United States Patent
Zhao et al.

(10) Patent No.: US 9,251,639 B2
(45) Date of Patent: Feb. 2, 2016

(54) PRODUCT SELECTION SYSTEM AND METHOD FOR VENDING MACHINE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jian Zhao, Wuhan (CN); Chong He, Wuhan (CN); Xiao-Hui Wang, Wuhan (CN); Wen-Jun Hu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 344 days.

(21) Appl. No.: 13/965,361

(22) Filed: Aug. 13, 2013

(65) Prior Publication Data

US 2014/0180472 A1 Jun. 26, 2014

(30) Foreign Application Priority Data

Dec. 26, 2012 (CN) ........................ 2012 1 05737960

(51) Int. Cl.
*G06F 7/08* (2006.01)
*G07F 11/00* (2006.01)

(52) U.S. Cl.
CPC .................................... *G07F 11/005* (2013.01)

(58) Field of Classification Search
CPC ....... G06Q 20/04; G06Q 20/10; G06Q 20/18; G06Q 20/20; G06Q 20/24; G06Q 20/32; G06Q 20/382; G07F 11/002; G07F 11/005; G07F 5/18; G07F 9/026
See application file for complete search history.

(56) References Cited

U.S. PATENT DOCUMENTS

| | | | | |
|---|---|---|---|---|
| 5,914,886 | A * | 6/1999 | Lee | G07F 9/02 221/129 |
| 6,980,887 | B2 * | 12/2005 | Varga et al. | G06Q 10/087 221/6 |
| 7,357,314 | B2 * | 4/2008 | Kusakawa | G07F 9/026 235/375 |
| 7,726,562 | B2 * | 6/2010 | Walker et al. | G06Q 20/10 235/375 |

* cited by examiner

*Primary Examiner* — Seung Lee
(74) *Attorney, Agent, or Firm* — Novak Druce Connolly Bove + Quigg LLP

(57) ABSTRACT

A product selection system for a vending machine is provided which is immune to human misbehavior or uncertainty. The system includes a main controller and a plurality of product selection panels connected to the main controller. Each product selection panel includes a plurality of keys, each of which is associated with a type of product stored in the vending machine. When a product selection panel detects a first key-down event, the main controller broadcasts a suspending command to the product selection panels so each product selection panel suspends the detection of any further key-down event in response to receiving the suspending command, until after a product-dispensing routine has been completed or the expiry of a predetermined period of time. A product selection method for a vending machine is also provided.

20 Claims, 2 Drawing Sheets

PRODUCT SELECTION SYSTEM AND METHOD FOR VENDING MACHINE

REFERENCE TO RELATED APPLICATIONS

This application claims all benefits accruing under 35 U.S.C. §119 from China Patent Application No. 201210573796.0, filed on Dec. 26, 2012 in the State Intellectual Property Office of China. The contents of the China Application are hereby incorporated by reference.

BACKGROUND

1. Technical Field

The disclosure generally relates to vending machines, and particularly relates to product selection systems and methods for vending machines.

2. Description of Related Art

Vending machines have been in common use for dispensing items such as snacks, beverages, alcohol, cigarettes, lottery tickets, cologne, consumer products and even gold and gems to customers automatically, after the customers insert currency or credit into the machines. These vending machines typically have a plurality of selector keys or switches to allow the customer to select a specific item. However, when multiple selector keys are pressed down simultaneously or consecutively in an extremely short span of time, the vending machines cannot determine a correct response and a conflict will occur accordingly.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
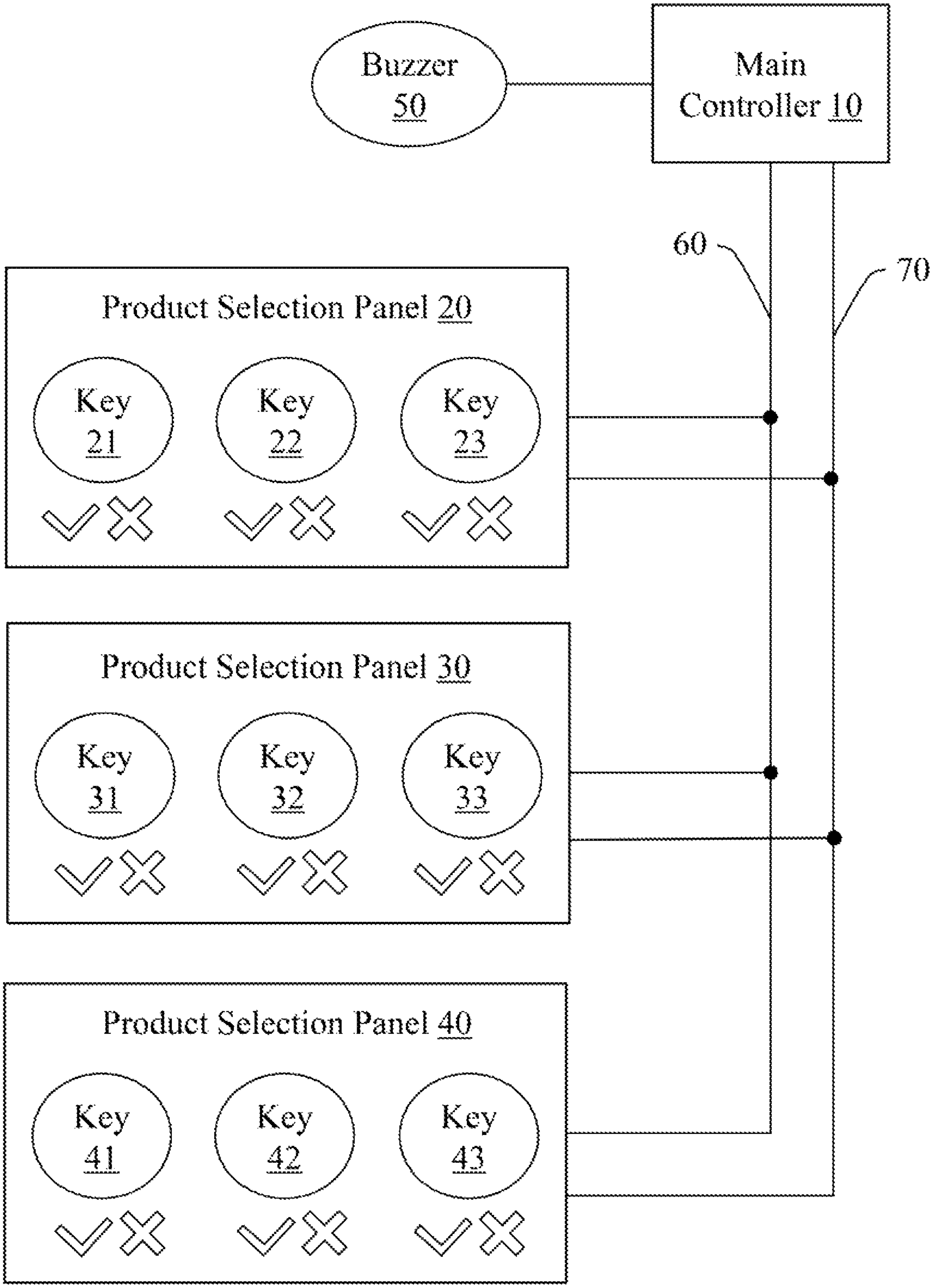
FIG. 1 is a block diagram of one embodiment of a product selection system for a vending machine.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives.

FIG. 1 shows one embodiment of a product selection system for a vending machine. The product selection system includes a main controller 10, product selection panels 20, 30 and 40, and a buzzer 50.

The product selection panels 20-40 are connected to the main controller 10 via a bus 60 and an interrupt line 70. In some embodiments, the bus 60 is an RS-485 bus.

The product selection panel 20 includes selector keys 21, 22, and 23. Each of the keys 21-23 is associated with a type of product stored in the vending machine. In some embodiments, a plurality of indicating lamps is located below the keys 21-23. For example, when a V-shaped lamp below a selector key is turned on, it represents that a particular type of product is stocked, and when an X-shaped lamp below a selector key is turned on, it represents that a particular type of product is sold out.

The product selection panel 30 includes selector keys 31-33 and the product selection panel 40 includes selector keys 41-43, and all panels operate in the same way. In some embodiments, a plurality of indicating lamps is located below the keys 31-33 and 41-43.

When a user presses down one of the selector keys, the corresponding product selection panel detects a key-down event. In response to the key-down event, the product selection panel sends an interrupt signal to the main controller 10. In some embodiments, when the product selection panel detects the key-down event, the product selection panel pulls voltage of the interrupt line 70 to high level. When the main controller 10 detects that the voltage of the interrupt line 70 is turned to high level, the main controller 10 determines that an interrupt signal is received.

When the main controller 10 receives the interrupt signal from the product selection panel, the main controller 10 broadcasts a suspending command to all of the product selection panels 21-23, 31-33, and 41-43, via the bus 60. Each of the product selection panels 21-23, 31-33, and 41-43 suspends further detection of any key-down event in response to receiving the suspending command. Thus, any new key-down event will be ignored.

When the main controller 10 receives the interrupt signal from the product selection panel, the main controller 10 obtains the detected key-down event from the product selection panels via the bus 60. The main controller 10 executes a routine associated with the key-down event to dispense a product.

The buzzer 50 is connected to the main controller 10. When the main controller 10 receives the interrupt signal from the product selection panel, the main controller 10 may control the buzzer 50 to buzz as an acknowledgement to the user of a command given to the vending machine.

When the main controller 10 has finished executing the routine associated with the key-down event, the main controller 10 broadcasts a resuming command to all of the product selection panels 21-23, 31-33, and 41-43 via the bus 60. Each of the product selection panels 21-23, 31-33, and 41-43 resumes detection of key-down events in response to receiving the resuming command.

In some embodiments, when the product selection panels 21-23, 31-33, and 41-43 do not receive a resuming command within a predetermined time period, the product selection panels 21-23, 31-33, and 41-43 may resume detection of key-down event themselves without the a resuming command.

Figure 2:
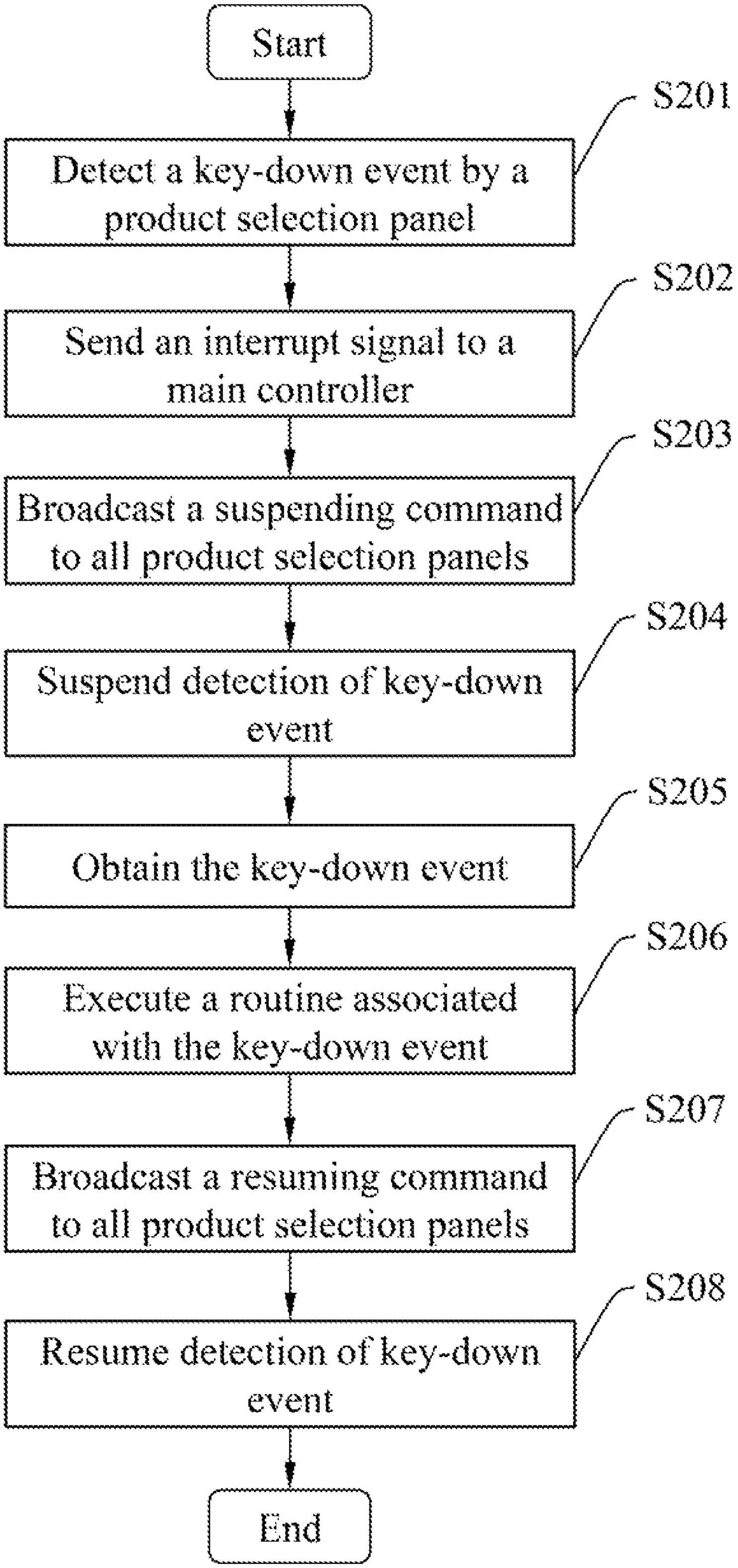
FIG. 2 is a flowchart of one embodiment of a product selection method for a vending machine.

FIG. 2 shows a flowchart of one embodiment of a product selection method for a vending machine. The method includes the following steps.

In step S201, a key-down event is detected in relation to one of the product selection panels 20, 30, and 40.

In step S202, the product selection panel sends an interrupt signal to the main controller 10 via the interrupt line 70.

In step S203, the main controller 10 broadcasts a suspending command to all of the product selection panels 21-23, 31-33, and 41-43, via the bus 60.

In step S204, each of the product selection panels 21-23, 31-33, and 41-43 suspends the further detection of key-down event in response to receiving the suspending command. Thus, any new key-down event will be ignored.

In step S205, the main controller 10 obtains the detected key-down event from a product selection panel via the bus 60.

In step S206, the main controller 10 executes a routine associated with the key-down event to dispense a product.

In step S207, when the main controller 10 has finished executing the routine associated with the key-down event, the main controller 10 broadcasts a resuming command to all of the product selection panels 21-23, 31-33, and 41-43, via the bus 60.

In step S208, each of the product selection panels 21-23, 31-33, and 41-43 resumes the detection of key-down event in response to receiving the resuming command Although numerous characteristics and advantages have been set forth in the foregoing description of embodiments, together with details of the structures and functions of the embodiments, the disclosure is illustrative only, and changes may be made in detail, especially in the matters of arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may give some indication in reference to certain steps. However, any indication given is only to be viewed for identification purposes, and is not necessarily a suggestion as to an order for the steps.

What is claimed is:

1. A product selection system for a vending machine, the product selection system comprising:
- a main controller; and
- a plurality of product selection panels connected to the main controller, each of the plurality of product selection panels comprising a plurality of keys, each of the plurality of keys being associated with a type of product stored in the vending machine;
- wherein when one of the plurality of product selection panels detects a key-down event, the main controller is configured to broadcast a suspending command to the plurality of product selection panels, and each of the plurality of product selection panels is configured to suspend detection of key-down event in response to receiving the suspending command.

2. The product selection system of claim 1, wherein when one of the plurality of product selection panels detects the key-down event, the one of the plurality of product selection panels is configured to send an interrupt signal to the main controller.

3. The product selection system of claim 2, wherein the main controller is further configured to broadcast the suspending command to the plurality of product selection panels in response to receiving the interrupt signal.

4. The product selection system of claim 3, further comprising a buzzer connected to the main controller, wherein the main controller is further configured to control the buzzer to buzz in response to receiving the interrupt signal.

5. The product selection system of claim 3, wherein the main controller is further configured to obtain the key-down event from the one of the plurality of product selection panels in response to receiving the interrupt signal.

6. The product selection system of claim 5, wherein the main controller is further configured to execute a routine associated with the key-down event to dispense a product.

7. The product selection system of claim 6, wherein the main controller is further configured to broadcast a resuming command to the plurality of product selection panels when the main controller has finished executing the routine.

8. The product selection system of claim 7, wherein each of the plurality of product selection panels is further configured to resume detection of key-down event in response to receiving the resuming command.

9. The product selection system of claim 5, wherein each of the plurality of product selection panels is connected to the main controller via an RS-485 bus and an interrupt line, the plurality of product selection panels is configured to send the interrupt signal to the main controller via the interrupt line, and the main controller is configured to obtain the key-down event from the plurality of product selection panels via the RS-485 bus.

10. The product selection system of claim 9, wherein when one of the plurality of product selection panels detects the key-down event, the one of the plurality of product selection panels is configured to pull voltage of the interrupt line to high level.

11. A product selection method for a vending machine, the product selection method comprising:
- connecting a plurality of product selection panels to a main controller, each of the plurality of product selection panels comprising a plurality of keys, each of the plurality of keys being associated with a type of product stored in the vending machine;
- detecting key-down event by the plurality of product selection panels;
- broadcasting a suspending command to the plurality of product selection panels by the main controller, when one of the plurality of product selection panels detects a key-down event; and
- suspend detection of key-down event by each of the plurality of product selection panels in response to receiving the suspending command.

12. The product selection method of claim 11, further comprising when one of the plurality of product selection panels detects the key-down event, sending an interrupt signal to the main controller by the one of the plurality of product selection panels.

13. The product selection method of claim 12, wherein the main controller broadcasts the suspending command to the plurality of product selection panels in response to receiving the interrupt signal.

14. The product selection method of claim 13, further comprising:
- connecting a buzzer to the main controller; and
- controlling the buzzer to buzz by the main controller in response to receiving the interrupt signal.

15. The product selection method of claim 13, further comprising obtaining the key-down event from the one of the plurality of product selection panels by the main controller in response to receiving the interrupt signal.

16. The product selection method of claim 15, further comprising executing, by the main controller, a routine associated with the key-down event to dispense a product.

17. The product selection method of claim 16, further comprising broadcasting a resuming command to the plurality of product selection panels by the main controller when the main controller has finished executing the routine.

18. The product selection method of claim 17, further comprising resuming detection of key-down event by each of the plurality of product selection panels in response to receiving the resuming command.

19. The product selection method of claim 15, wherein each of the plurality of product selection panels is connected to the main controller via an RS-485 bus and an interrupt line, the plurality of product selection panels is sends the interrupt signal the main controller via the interrupt line, and the main controller obtains the key-down event from the plurality of product selection panels via the RS-485 bus.

20. The product selection method of claim 19, further comprising when one of the plurality of product selection panels detects the key-down event, pulling voltage of the interrupt line to high level by the one of the plurality of product selection panels.

* * * * *